(12) United States Patent
Fan et al.

(10) Patent No.: US 11,875,489 B2
(45) Date of Patent: Jan. 16, 2024

(54) DETECTING HYBDRID-DISTANCE ADVERSARIAL PATCHES

(71) Applicant: International Business Machines Corporation, Armonk, NY (US)

(72) Inventors: Quanfu Fan, Lexington, MA (US); Sijia Liu, Somerville, MA (US); Richard Chen, Baldwin Place, NY (US); Rameswar Panda, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 17/363,054

(22) Filed: Jun. 30, 2021

(65) Prior Publication Data

US 2023/0005111 A1   Jan. 5, 2023

(51) Int. Cl.
*G06T 5/50* (2006.01)
*G06T 7/90* (2017.01)
*G06V 20/58* (2022.01)

(52) U.S. Cl.
CPC .............. *G06T 5/50* (2013.01); *G06T 7/90* (2017.01); *G06V 20/58* (2022.01); *G06T 2207/10024* (2013.01); *G06T 2207/20081* (2013.01)

(58) Field of Classification Search
CPC ... G06T 5/50; G06T 7/90; G06T 2207/10024; G06T 2207/20081; G06V 20/58; G06V 10/82
See application file for complete search history.

(56) References Cited

U.S. PATENT DOCUMENTS

| 10,825,148 | B2 | 11/2020 | Tagra et al. |
| 10,839,268 | B1 | 11/2020 | Ardulov et al. |
| 10,910,099 | B2 | 2/2021 | Xu et al. |
| 11,151,703 | B2 * | 10/2021 | Sargent ............... G06T 5/50 |
| 2021/0103814 | A1 | 4/2021 | Tsiligkaridis |
| 2023/0206601 | A1 | 6/2023 | Metzen |

FOREIGN PATENT DOCUMENTS

| CN | 111340008 A | 6/2020 | |
| DE | 102020004960 A1 * | 5/2021 | ........... G06K 9/6201 |

OTHER PUBLICATIONS

Eykholt et al., "Robust Physical-World Attacks on Deep Learning Visual Classification," In Proceedings of the IEEE Conference on Computer Vision and Pattern Recognition, 2018, pp. 1625-1634.
Sharif et al., "Accessorize to a Crime: Real and Stealthy Attacks on State-of-the-Art Face Recognition," ACM, In Proceedings of the 2016 ACM SIGSAC Conference on Computer and Communications Security, 2016, pp. 1528-1540.

(Continued)

*Primary Examiner* — Mekonen T Bekele
(74) *Attorney, Agent, or Firm* — Kelli D. Morin

(57) ABSTRACT

A hybrid-distance adversarial patch generator can be trained to generate a hybrid adversarial patch effective at multiple distances. The hybrid patch can be inserted into multiple sample images, each depicting an object, to simulate inclusion of the hybrid patch at multiple distances. The multiple sample images can then be used to train an object detection model to detect the objects.

20 Claims, 8 Drawing Sheets

(56) References Cited

OTHER PUBLICATIONS

Xu et al., "Adversarial T-shirt! Evading Person Detectors in A Physical World," arXiv:1910.11099v3 [cs.CV], Jul. 7, 2020, 23 pages, https://arxiv.org/pdf/1910.11099.pdf.
Pautov et al., "On adversarial patches: real-world attack on ArcFace-100 face recognition system," 2019 International Multi-Conference on Engineering, Computer and Information Sciences (SIBIRCON), arXiv:1910.07067v3 [cs.CV], Apr. 1, 2020, 6 pages.
"AI-Aware Engine for Matching Learners with Mentors," IP.com., An IP.com Prior Art Database Technical Disclosure, IP.com No. IPCOM000261341D, IP.com Electronic Publication Date: Feb. 24, 2020, 5 pages.
"A Method for social and location-aware group sequential recommendation," IP.Com, An IP.com Prior Art Database Technical Disclosure, IP.com No. IPCOM000252662D, IP.com Electronic Publication Date: Feb. 1, 2018, 4 pages.
"A Method to Manage Patches on Multiple Computer Systems," IP.Com, An IP.com Prior Art Database Technical Disclosure, IP.com No. IPCOM000259485D, IP.com Electronic Publication Date: Aug. 15, 2019, 3 pages.
McCoyd et al., "Minority Reports Defense: Defending Against Adversarial Patches," arXiv:2004.13799v1 [cs.LG] Apr. 28, 2020, Printed May 14, 2021, 9 pages.
Yang et al., "Design and Interpretation of Universal Adversarial Patches in Face Detection," arXiv:1912.05021v3 [cs.CV] Jul. 17, 2020, Printed May 14, 2021, 20 pages.
Metzen et al., "Efficient Certified Defenses Against Patch Attacks On Image Classifiers," arXiv:2102.04154v1 [cs.LG] Feb. 8, 2021, Published as a conference paper at ICLR 2021, 17 pages.
Brown et al., "Adversarial Patch," 31st Conference on Neural Information Processing Systems (NIPS 2017), 2017, 5 pages.
Thys et al., "Fooling automated surveillance cameras: adversarial patches to attack person detection," CVPR Workshops, arXiv:1904.08653v1 [cs.CV], Apr. 18, 2019, 7 pages.
Zhao et al., "Seeing isn't Believing: Towards More Robust Adversarial Attack Against Real World Object Detectors," CSS19, arXiv:1812.10217v3 [cs.CV], Sep. 4, 2019, 16 pages.
Zhang et al., "Deep Mutual Learning," CVPR 2018, arXiv:1706.00384v1 [cs.CV], Jun. 1, 2017, 10 pages.
Lan et al., "Knowledge Distillation by On-the-Fly Native Ensemble," NIPS 2018, arXiv:1806.04606v2 [cs.CV], Sep. 8, 2018, 11 pages.
Chen et al., "Can 3D Adversarial Logos Cloak Humans?," arXiv:2006.14655v1 [cs.LG], Jun. 25, 2020, 10 pages.
Bor-Chun Chen et al., "Toward Realistic Image Compositing with Adversarial Learning," Printed Jun. 29, 2021, 10 pages.
Athalye et al., "Synthesizing Robust Adversarial Examples," arXiv:1707.07397v3 [cs.CV], Jun. 7, 2018, 19 pages.
Wu et al., "Making an Invisibility Cloak: Real World Adversarial Attacks on Object Detectors," arXiv:1910.14667v2 [cs.CV], Jul. 22, 2020, 16 pages.
"Generating Realistic Physical Adversarial Examples by Patch Transformer Networks," CVPR 2021 Submission #9922, 2021, 13 pages.
Athalye et al., "Obfuscated Gradients Give a False Sense of Security: Circumventing Defenses to Adversarial Examples," arXiv:1802.00420v4 [cs.LG], Jul. 31, 2018, 12 pages.
Carlini et al., "Audio Adversarial Examples: Targeted Attacks on Speech-to-Text," IEEE, In 2018 IEEE Security and Privacy Workshops (SPW), 2018, pp. 1-7.
Xu et al., "Structured Adversarial Attack: Towards General Implementation and Better Interpretability," In International Conference on Learning Representations, 2019, 21 pages.
List of IBM Patents or Applications Treated as Related, Dated Jun. 29, 2021, 2 pages.
Fan et al., "Adversarial Image Generator," U.S. Appl. No. 17/363,043, filed Jun. 30, 2021.

* cited by examiner

DETECTING HYBDRID-DISTANCE ADVERSARIAL PATCHES

BACKGROUND

The systems and methods of the present disclosure relate to object detection.

Adversarial patches are an emerging technology designed to deceive automated object detection, particularly machine-learning-based recognition. As an example, a camera observing a space may transmit a video feed to a machine learning model trained to identify people seen by the camera. In response, a person may wear clothing with an adversarial patch (for example, an adversarial patch may be a pattern printed on a T-shirt). To a human observer, an adversarial patch may appear as a mass of seemingly random pixels, not unlike corrupted image data. However, the specific pattern of an adversarial patch, when analyzed by a machine learning model, may throw off results of the machine learning model (e.g., a system attempting to identify a person in an image may fail to do so simply due to the image including an adversarial patch). In this way, adversarial patches can serve as a digital form of camouflage.

While adversarial patches may be useful to prevent unauthorized surveillance, malicious actors may use them to fool helpful object detection models. For example, adversarial patches have been placed on street signs in an apparent attempt to prevent automated vehicle safety systems from being able to recognize the signs.

SUMMARY

Some embodiments of the present disclosure can be illustrated as a method. The method comprises training a hybrid adversarial patch generator. The method also comprises generating a hybrid adversarial patch via the hybrid adversarial patch generator. The method also comprises inserting the hybrid adversarial patch into a first image, resulting in a first modified image depicting the hybrid adversarial patch at a first distance and a first object. The method also comprises inserting the hybrid adversarial patch into a second image, resulting in a second modified image depicting the hybrid adversarial patch at a second distance and a second object.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
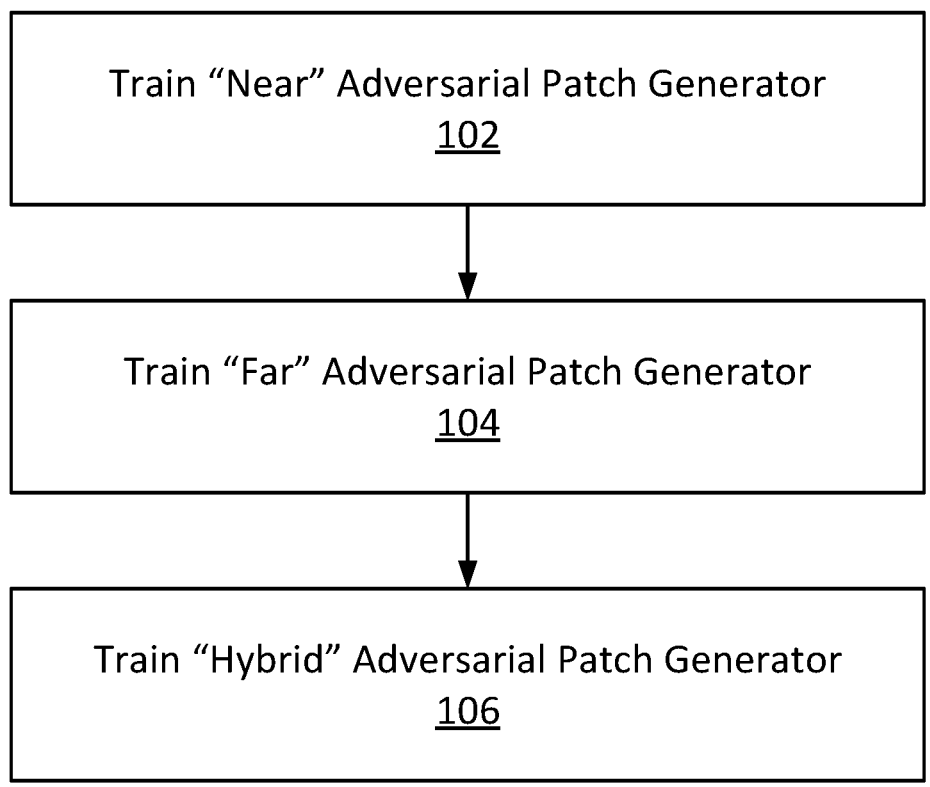
FIG. 1 is a high-level method for training a hybrid adversarial patch generator to defeat object detection models, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to train a hybrid adversarial patch generator to defeat object detection models. More particular aspects relate to a system and a method to train a hybrid distance adversarial patch generator, generate a hybrid patch from the generator, modify images to include the hybrid patch, submit the images to an object detection model, receive an output from the model, and revise the patch generator based on the output.

Adversarial patches are an emerging technology designed to deceive automated object detection, particularly deep-learning-based detection. As an example, a camera observing a space may transmit a video feed to a machine learning model trained to identify people seen by the camera. In response, a person may wear clothing with an adversarial patch (for example, an adversarial patch may be a pattern printed on a T-shirt). To a human observer, an adversarial patch may appear as a mass of seemingly random pixels, similar to corrupted image data. However, the specific pattern of an adversarial patch, when analyzed by a machine learning model, may throw off results of the machine learning model (e.g., a system attempting to identify a person in an image may fail to do so simply due to the image including an adversarial patch). In this way, adversarial patches can serve as a digital form of camouflage.

As an illustrative example, a user may capture an image of a dog and a cat. The image may be input to an object detection model, which may detect, based on a trained machine learning model, that the image depicts a dog and a cat. A user may then put an adversarial patch on the dog and capture an otherwise-identical image. The second image may be input to the same object detection model. However, due to the adversarial patch included in the second image, the object detection model may incorrectly determine that the second image only depicts a cat (e.g., the system may fail to detect the dog at all). In other examples, the adversarial patch may cause the system to incorrectly determine that the second image depicts a cat and an avocado (e.g., the system may misidentify the dog as an avocado) or that the second image depicts a sunset (e.g., the system may misidentify both the dog and the cat). Notably, the adversarial patch need not simply be a picture of an avocado (or a blank covering) placed over the dog to obscure it; the patch may appear to the user to be an abstract image with no discernable pattern, and the majority of the identifying features of the dog (e.g., the dog's face, overall shape, markings, etc.) may still be visible in the second image. Nonetheless, the adversarial patch may still be able to disrupt the object detection model simply by being present in the image.

A "performance" of an adversarial patch describes how consistently the patch is able to disrupt an object detection model (e.g., how much of an impact the patch has on the system's accuracy). Performance can vary wildly between patches, models, and images; an image including a first patch may completely fool a first object detector (e.g., YOLOv3) but be consistently defeated by a second object detector (e.g., RetinaNet). At the same time, an image including a second patch may be consistently defeated by the first system but completely fool the second system.

Adversarial patch performance often varies with how the patch appears in a given image. For example, a person may be wearing a shirt with an adversarial patch printed on the shirt. A picture of the person may be captured, compressed, and input to an object detection model. The appearance of the patch in the compressed picture (i.e., what the detection system "sees") may differ significantly from an uncompressed image file of the adversarial patch itself. For example, the captured picture may be poorly lit, resulting in portions of the patch appearing black or "washed out." As another example, the person's shirt may be wrinkled, resulting in portions of the patch appearing distorted/shaded slightly differently. Further, the patch may not be directly facing the camera capturing the image, which may result in portions of the patch being omitted entirely from the picture, some portions appearing compressed, etc.

One major impact on patch performance is distance from a camera. For example, two images may be captured of a person wearing a shirt including an adversarial patch: a first image where the person (and, more importantly, the patch) is relatively close to the camera capturing the image (e.g., within 3 meters), and a second image where the person (and patch) are relatively far from the camera (e.g., 9 meters or farther away). The appearance of the patch in the two images will likely be substantially different, as the patch in the second image will appear smaller, and the distance will result in some lost information (e.g., the patch will appear less detailed). Because appearance within an image is a major factor of performance, the patch can be expected to perform differently between the two images.

In practice, adversarial patches are typically generated and checked for effectiveness at deceiving object detection models. A patch generated this way is typically more effective at closer distances (and thus it is referred to as a "near" patch). This is because features of the patch that enable it to mislead an object detection model (whatever those features may be) become blurred and/or distorted when viewed from longer distances. For example, a patch consisting of a regular grid of black and white squares, when viewed from a sufficient distance, may simply appear as a solid block of gray. The sharp contrast between the black squares and the white squares may be the feature primarily responsible for the patch's effectiveness. Thus, viewing the patch from a great distance can result in the patch losing effectiveness, as the object detection model will not "see" the grid.

However, patches can be generated specifically to perform well at far distances (when they appear at lower levels of detail in a captured image). Patches that are designed to be effective at far distances (regardless of whether they actually are effective) are referred to as "far" patches or "far distance" patches for purposes of this disclosure.

Far patches often have reduced performance at near distances. This is because far patches are generally designed to be viewed at lower levels of detail (e.g., from farther away), so the increased detail included in a near image can result in hindered performance of a far patch. For example, a far patch may include subtle features that might typically hinder the patch's effectiveness, but that are typically lost when the patch is viewed from a far distance.

Notably, while the present disclosure refers extensively to "distance," "near," "far," and the like, this is merely for purposes of illustration; similar effects can be achieved through different variables, particularly specific features of various cameras. For example, a particularly high-quality first camera can capture a first image including a "near" adversarial patch that is 150 meters from the camera with a high level of detail, while a low-quality second camera may capture a second image including the near patch from 3 meters away with a lower level of detail. As a "near" patch, the adversarial patch may generally be expected to be more effective at shorter distances (as the loss of detail associated with greater distances can reduce effectiveness). However, in this example, submitting both images to the same object detection model may result in the object detection model failing to identify an object in the first image but successfully identifying the object in the second image, even though the near patch is significantly closer to the camera in the second image. This is because the quality of the first camera results in the object detection model "seeing" the near patch in the first image with a high level of detail, resulting in the near patch being more effective. In contrast, the quality of the second camera results in the model seeing the near patch in the second image with a low level of detail, resulting in the near patch being less effective. Thus, while distance is generally a good analog for level of detail, other factors can also affect patch performance, such as lens types, motion blur, etc.; in the interest of brevity, "distance" is the primary descriptor used in this disclosure.

A "patch generator" may be a machine learning model that can be trained to generate adversarial patches. As adversarial patches are typically most effective within a particular distance range, different generators may be utilized to generate patches effective at different distance ranges. For example, a first patch generator may generate adversarial patches that are effective at relatively short distances (but ineffective at longer distances) if near-view images are used for training, while with far-view training data, a second patch generator may generate adversarial patches that are effective at relatively long distances (but ineffective at shorter distances). Such generators can be referred to as "near" patch generators and "far" patch generators, respectively. A third adversarial patch generator, trained with both near-view and far-view data, may achieve a tradeoff near distance performance and far distance performance.

Systems and methods consistent with the present disclosure enable training adversarial patch generators. However, in some instances, the patch generators themselves may be pre-trained or preexisting generators, and the systems described herein may not have access or permissions to modify the generators. Instead, in such instances, systems and methods consistent with the present disclosure may train modifiers to receive a generated patch (from a pretrained generator) and modify the received patch. In the interest of brevity, this is still referred to as "training a patch generator, "; the pretrained generator and the trained modifier are referred to collectively as a patch generator.

Systems and methods consistent with the present disclosure enable generation of "hybrid" patches that are effective at multiple distances. In several embodiments, hybrid patches can be generated based on both near and far patches. As a simple example, a hybrid patch may simply be an average or merge of a near patch and a far patch. Hybrid patches may result in reduced performance at a given range than a "dedicated" near/far patch, but sometimes only slightly. For example, a near patch may have a performance of 95% at near distances and 3% at far distances, while a far patch may have a performance of 13% at near distances and 89% at far distances. A hybrid patch generated based on both the near patch and the far patch may have a performance of 90% at near distances and 82% at far distances.

Hybrid patches can be used to train models to be increasingly robust and capable of defeating them. As used herein, "defeating" an adversarial patch refers to a system successfully identifying an object the patch is attempting to obfuscate (e.g., identifying a person wearing a shirt with an adversarial patch on it). In some instances, adversarial patches may be specifically detected and disregarded (e.g., removed from an image), allowing a system to detect objects without considering the patch. In other instances, adversarial patches may simply go unnoticed, and the system may detect objects in spite of the patch.

FIG. 1 is a high-level method 100 for training an object detection model to defeat hybrid-distance adversarial patches, consistent with several embodiments of the present disclosure. In order to defeat hybrid-distance patches, method 100 includes training patch generators. As described above, a patch generator may be a machine learning model that can generate adversarial patches. Different generators may be utilized to generate patches effective at different distance ranges. For example, a "near" patch generator may generate adversarial patches that are effective at relatively short distances (but may be ineffective at longer distances), while a "far" patch generator may generate adversarial patches that are effective at relatively long distances (but may be ineffective at shorter distances).

Method 100 comprises training a "near" adversarial patch generator at operation 102. An example of how patch generators may be trained is provided in FIG. 2, discussed below with reference to method 200. In general, operation 102 includes training a generator to generate near adversarial patches. As an explanatory example, a camera may capture a picture including an adversarial patch and an object. The patch may appear to be close to the camera (for example, the patch may appear to be relatively large and/or may be depicted at a high level of detail) and an object detection model may attempt to identify the object. If the object detection model is unable to detect the object, the patch may be considered an effective "near patch." In some instances described in further detail below, a camera may capture a picture including an object and then a patch image modifier may digitally insert the patch into the picture to appear as though the patch is near to the camera, resulting in an image including the object and the patch.

A patch generator can be trained as a machine learning model. For example, an initial iteration of a patch generator may generate patches randomly. The patches may then be tested against one or more object detection models to determine an effectiveness rating for the patch. Randomly generated adversarial patches are generally unlikely to be effective, so adjustments may be made to the generator, after which the generator may be used to generate additional patches. This training process can be repeated until the generator produces patches that satisfy given performance criteria.

Method 100 further comprises training a "far" adversarial patch generator at operation 104. Operation 104 may be performed in a similar manner to operation 102, except the generator may be trained to generate effective "far" patches. As an explanatory example, a camera may capture a picture including an adversarial patch and an object. The patch may appear to be far from the camera (for example, the patch may appear to be relatively small and/or may be depicted at a low level of detail) and an object detection model may attempt to identify the object. If the object detection model is unable to identify the object, the patch may be considered an effective "far patch." In some instances described in further detail below, a camera may capture a picture including an object and then a patch image modifier may digitally insert the patch into the picture to appear as though the patch is far from the camera, resulting in an image including the object and the patch.

Method 100 further comprises training a "hybrid" adversarial patch generator at operation 106. An example method 500 for training a hybrid adversarial patch generator is provided in FIG. 5 and discussed in further detail below. As an overview, operation 106 may be performed based in part on patches generated by the near and far generators trained at operations 102 and 104, respectively. For example, in some instances, the hybrid adversarial patch generator can be trained to generate patches based on a simple merge of a near patch and a far patch. An example of such a merge is provided in FIG. 6 and discussed in further detail below. In more complex implementations, the hybrid generator may leverage different aspects of near patches and far patches. For instance, a hybrid patch may be generated with an outer portion based upon a far patch but an inner portion based on a near patch.

As an illustrative example, a far patch may be a 30 pixel×30 pixel square of a first pattern and a near patch may be 30 pixel×30 pixel square of a second pattern; a hybrid patch based on the two may be a 30 pixel×30 pixel square with both patterns. For example, a central 15 pixel×15 pixel region of the hybrid patch might consist of the second (near) pattern while the surrounding 15 pixel-wide boundary region might consist of the first (far) pattern.

In some instances, each pixel from a near and far patch may be included in the hybrid patch. This means the hybrid patch may be larger than any of the near or far patches. As an example, a 60 pixel×60 pixel hybrid patch may be generated based upon four 30 pixel×30 pixel patches (such as two 30 pixel×30 pixel near patches, N1 and N2, and two 30 pixel×30 pixel far patches, F1 and F2). While each of the input near and far patches may be grids of pixels, the hybrid patch may be considered a grid of "superpixels," where each superpixel comprises 4 pixels (1 from each input patch). For example, a top left superpixel in the hybrid patch may include the top left pixel of each of the four input patches.

In some instances, a near patch and a far patch may be "striped" to generate a hybrid patch. For example, if both the near and far patches are squares of equal size, a hybrid patch may also be a square of the same size. The hybrid patch may be comprised of pixels copied from either the near patch or the fear patch. For example, a leftmost column of pixels in the hybrid patch might be copied from a leftmost column of pixels in the near patch, a first-from-the-leftmost column of pixels in the hybrid patch might be copied from a first-from-the-leftmost column of pixels from the far patch, a second-from-the-leftmost column of pixels in the hybrid patch might be copied from a second-from-the-leftmost column of pixels in the near patch, and so on. Thus, columns of the hybrid patch may be copied from the two patches in an alternating fashion. Of course, this is not limited to vertical stripes (i.e., columns); rows can be striped, striping can be performed diagonally, etc.

Pixels may be described in terms of "relative position" in multiple different images. For example, a first relative position may be a top-left position (e.g., in a top row and a leftmost column). To illustrate, a first image may have a blue pixel in a top-left position, while a second image may have a red pixel in a top-left position. This can be described as a blue pixel in a first relative position in the first image and a red pixel in the first relative position in the second image. This "relative location" terminology can also refer to patches (e.g., a near patch may have a blue pixel in a second relative location while a far patch may have a red pixel in the second relative location).

In some instances, a hybrid patch generator may be trained by minimizing a total loss L on the training data. Loss L is a function of a hybrid patch P, a near patch $P_N$, a far patch $P_F$, and a set of images I. Loss L can be evaluated as a sum of component losses such as an attack loss $L_{attack}$, a knowledge distillation loss $L_{distill}$, and a sum of a total variation $L_{tv}$. This is represented in Equation 1, below:

$$L(P,P_N,P_F,I)=L_{attack}(P,P_N,P_F,I)+L_{distill}(P,P_N,P_F,I)+L_{tv}(P,P_N,P_F,I) \quad (1)$$

The attack loss $L_{attack}$ may represent a chance or rate at which an adversarial patch is defeated by an object detection model over a series of tests. For example, $L_{attack}=0$ may indicate that the object detection model successfully identified an object in spite of the patch in 0% of tests (e.g., the patch consistently defeated the model), while $L_{attack}=1$ may indicate that the object detection model successfully identified the object in spite of the patch in 100% of tests (e.g., the model consistently defeated the patch). The total attack loss utilized in Equation 1 is a sum of component attack losses for each patch, as shown in Equation 2:

$$L_{attack}(P,P_N,P_F,I)=L_{attack}(P,I)+L_{attack}(P_N,I)+L_{attack}(P_F,I) \quad (2)$$

The near and far attack losses ($P_N$ and $P_F$, respectively) can be determined via a sum of weighted losses l for each image f of the set I. The individual losses l can be weighted according to a distance weight γ, as shown in Equations 3 and 4:

$$L_{attack}(P_N, I) = \frac{1}{\|I\|}\sum_{f_i \in I} \gamma_i l(P, P_N, P_F, f_j) \quad (3)$$

$$L_{attack}(P_F, I) = \frac{1}{\|I\|}\sum_{f_i \in I} (1-\gamma_i) l(P, P_N, P_F, f_j) \quad (4)$$

Distance weight γ can enable control over whether patches are weighted to target near or far performances.

The knowledge distillation loss Limn is defined according to Equation 5, below:

$$L_{distill} = \lambda_N \frac{1}{\|I\|}\sum_{f_i \in I}(1-\gamma_j)cl_j(P, P_N, P_F, f_j) + \lambda_F \frac{1}{\|I\|}\sum_{f_j \in I}\gamma_j cl_j(P, P_N, P_F, f_j) \quad (5)$$

Where $\lambda_N$ and $\lambda_F$ are teaching weights enabling preference for the near patch or the far patch in the knowledge distillation process, respectively. $cl_j$ is a "contrast loss," which describes a similarity between the hybrid patch P and the near patch $P_N$, a far patch $P_F$, and a $j^{th}$ image $f_j$ of a set of images I. clj is defined according to Equation 6, below:

$$cl_j(P,P_+,P_-,f_j)=\max(|l(P,f_j)-l(P_+,f_j)|-|l(P,f_j)-l(P_-,f_j)|+m_s,0) \quad (6)$$

Where $m_s$ functions as a buffer value to prevent penalties that may otherwise result from minor discrepancies.

The total variation $L_{tv}$ essentially represents a level of smoothness/continuity in the patch. For example, a patch of completely random pixels may be more likely to have a relatively high $L_{tv}$, while a patch where colors are more localized into regions of pixels, having smoother transitions, may have a relatively low $L_{tv}$. Patches with relatively high $L_{tv}$ typically have a more noisy/discontinuous appearance. Adversarial patches with higher $L_{tv}$ may be more readily apparent, making them easier to detect (and therefore defeat), as well as being generally conspicuous, which a user of the adversarial patch may wish to avoid. As reducing $L_{tv}$ may not have a significant impact on patch effectiveness, in some embodiments, patches with lower $L_{tv}$ may be preferred. However, in other embodiments, the $L_{tv}$ term may be omitted from the calculation of the total loss L.

Minimizing the total loss L can result in a patch that is effective at both near distances and far distances, and control of weights γ and λ can enable a developer to prioritize towards a given distance or teacher, respectively.

In some instances, the hybrid patch generator may be trained based upon the near and far generators themselves, rather than (or in addition to) the patches they generate. Further, different features can be utilized from different generators. As an illustrative example, near patch generators and far patch generators may tend to generate patches with different color trends; a far patch generator may generate patches with minimal amounts of red (e.g., red-green-blue (RGB) values of the pixels in far patches may typically have an "R" value below 50 out of an example maximum of 256), while a near patch generator may generate adversarial patches with sharply contrasting colors (e.g., a first group of pixels in a near patch may be predominantly blue, and a second group of pixels in the near patch adjacent to the first group of pixels may be predominantly red with minimal blue). A hybrid patch generator may combine these trends to generate patches with minimal amounts of red but otherwise sharply contrasting colors (e.g., a first group of pixels in the hybrid patch may be predominantly blue, and a second group of pixels in the hybrid patch adjacent to the first group of pixels may be predominantly green with minimal blue, but few or no pixels in the hybrid patch have an "R" value above 50). As a different example, a near patch generator may utilize regions of sharply contrasting colors while a far patch generator may utilize triangular regions of varying size; a hybrid patch generator may combine these styles and generate patches with triangular regions of sharply contrasting colors.

In some instances, generation of hybrid patches can be weighted to "favor" a near patch or a far patch. As an example, a weight "k" may be used to describe a level of preference for near patches. A simple pixel-by-pixel average of a near patch and a far patch may constitute averaging an RGB value of a given pixel (e.g., top-left) in the near patch and an RGB value of a corresponding pixel (e.g., also top-left) in the far patch, resulting in an averaged RGB value utilized for the corresponding pixel in the hybrid patch. Without any weighting, the R (red) value for the hybrid patch (R_Hybrid) may be acquired by averaging the red value for the near patch (R_Near) and the red value for the far patch (R_Far), i.e., (R_Near+R_Far)/2. A weight "k" may be introduced to bias the merge in favor of the near or far patch; for example, R_Hybrid=(k*R_Near+R_Far)/(1+k). Thus, with k=1, the merging has no preference, but with k=7, R_Hybrid=(7*R_Near+R_Far)/8, strongly weighting the color of the hybrid pixel in favor of the color of the corresponding pixel of the near patch. In addition, 0<k<1 results in favoring the far patch; k=0 results in disregarding the near patch entirely.

Weights can be implemented in other ways as well. For example, a "striping" of a near and far patch can be weighted such that hybrid pixels copied from a near patch are averaged with their corresponding pixels in a far patch, resulting in some hybrid pixels that are direct copies of far patch pixels and the remaining hybrid pixels being an average of far patch and near patch pixels (thus weighting the generation of the patch in favor of the far patch).

Features of patch generators can also be weighted. For example, a near patch generator may utilize circular regions of sharply contrasting colors while a far patch generator may utilize triangular regions of predominantly blue colors. A hybrid patch generator combining these styles might utilize shapes more closely resembling triangles or circles, depending upon weight. Additionally or alternatively, the hybrid patch generator may utilize a mixture of circles and triangles, with a number of each depending upon weight.

In some instances, the hybrid adversarial patch generator can be utilized to train an object detection model to defeat hybrid adversarial patches at multiple distances. A more detailed example of training such a model is provided as method 700, discussed in further detail below with reference to FIG. 7. As an overview, this training may include acquiring at least two images including the same hybrid patch at different distances, determining whether the system can defeat the patch in both cases, and revising the system until it can.

For example, systems and methods consistent with the present disclosure may receive a patch generated by a hybrid adversarial patch generator trained via operation 106. An example system may then digitally alter a sample image by inserting the hybrid patch at a first distance into the sample image. A "sample image" may be an image captured by a camera depicting an object for an object detection model to classify. For example, the sample image may depict a first person standing 3 m away from the camera and a second person standing 15 m away from the camera. Both people may be wearing similar (or identical) shirts. The sample image may be submitted to an object detection model, which may identify that the image depicts two people.

The system may digitally alter the sample image to appear as though the first person's shirt has the hybrid patch on it; this altered image is referred to as a first (near) test image. The system may further digitally alter the sample image to appear as though the second person's shirt has the hybrid patch on it, resulting in a second (far) test image.

The test images may be submitted to an object detection model, which may output a result. If the object detection model successfully identified both people in both images, then the model has successfully defeated the hybrid patch. If the object detection model misidentified one or both people in either (or both) image(s), then the model may have failed to defeat the hybrid patch. If the model failed, the model can be revised (e.g., features/layers can be modified), and the test can be run again to determine if the revision was helpful. In some instances, the model may be revised until the most recent revision results in decreased performance (relative to the preceding revision).

Figure 2:
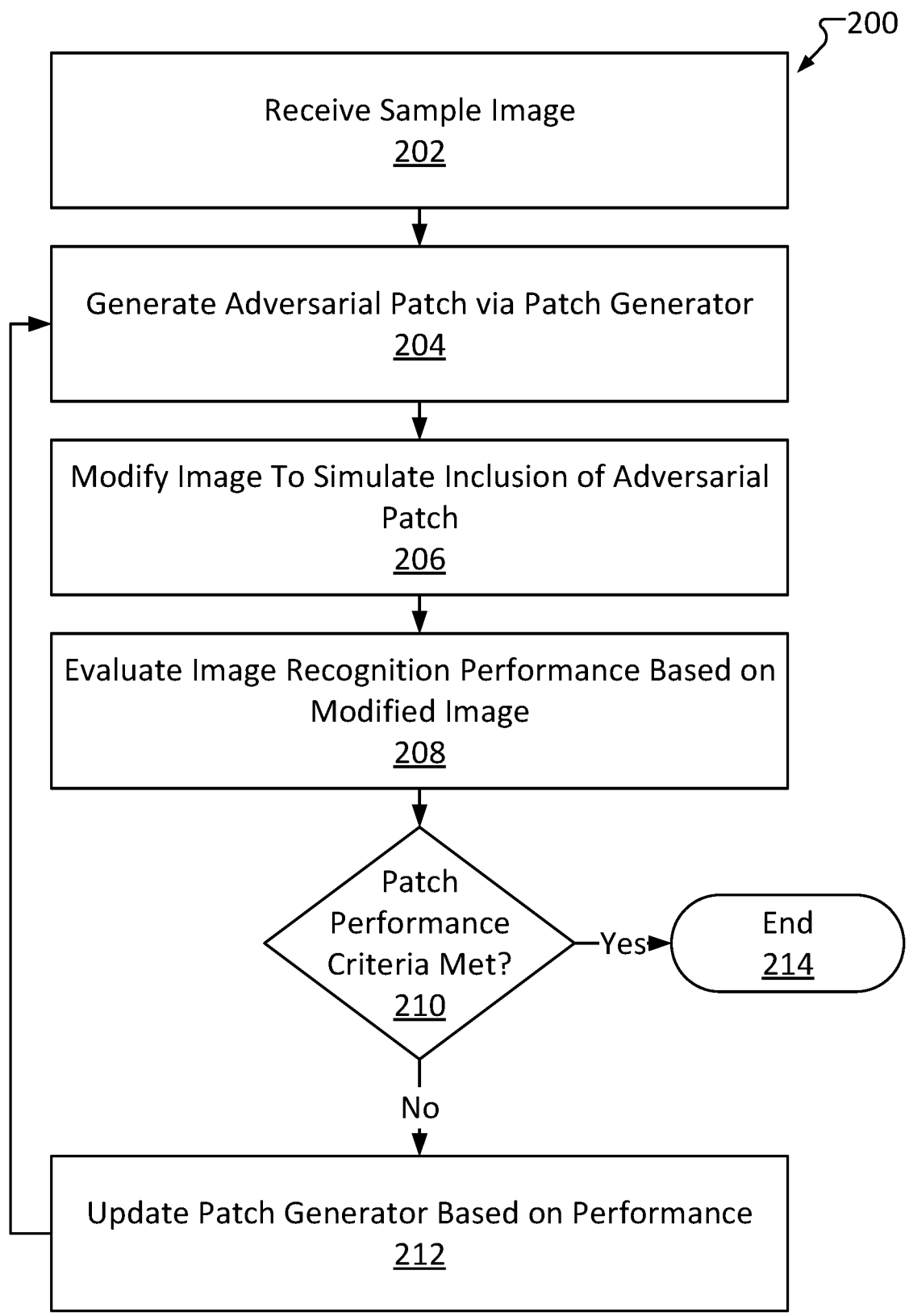
FIG. 2 is a method for training an adversarial patch generator, consistent with several embodiments of the present disclosure.

FIG. 2 is a method 200 for training an adversarial patch generator, consistent with several embodiments of the present disclosure. Method 200 comprises receiving a sample image at operation 202. As discussed above, a sample image may depict an object in order to evaluate performance of an object detection model and/or an adversarial patch. Operation 202 may include, for example, receiving an image from a database (such as database 320, discussed below with reference to FIG. 3). In some instances, the sample image received at operation 202 may include a marking to designate where an adversarial patch may be inserted. For example, the sample image may be an image of a user of a system performing method 100, and the user may be wearing a shirt including scan targets designating boundaries of a patch region. In some instances, the sample image may include metadata tags designating where a patch should be inserted (for example, a set of four pixels defining a quadrilateral region in the image). While sometimes useful, such indicators may not be required; the sample image received at operation 202 may, for example, be a stock image or publicly available image without any metadata tags. In some instances, metadata tags may be manually added (for example, a user might designate areas in the image suitable for tags).

Many examples described throughout the present disclosure refer to an image of a person wearing a shirt with an adversarial patch either depicted on the shirt or inserted into the image to appear on the shirt. However, many other examples simulating other use cases for adversarial patches are also considered. For example, adversarial patches may be tested or depicted on road signs, animals, bodies of text such as license plates, etc.

Method 200 further comprises generating an adversarial patch via an adversarial patch generator at operation 204. In general, operation 204 may include selecting a size of the patch and adding features to a "template" to generate a patch. For example, operation 204 may include selecting a 600×600 pixel patch (based on a default value or user input). A trained patch generator might add specific features to a particular template in order to yield an effective adversarial patch; for example, a trained patch generator might add curves and edges according to a particular pattern, resulting in modifying the template image into the adversarial patch. However, in some instances, the adversarial patch generator may initially be untrained. For example, operation 204 may initially include generating a set of random pixels (for example, each pixel may have randomly determined red/green/blue (RGB) values) for use as a template. In other instances, the template may initially simply be a blank (i.e., white) image. Further, an untrained patch generator may modify the template in a random manner. For example, an artificial neural network (ANN) may be utilized, including various layers, connections, and weights; an untrained ANN may initially have random or default weights, which may be adjusted over time. In some instances, operation 204 may utilize an adversarial patch that is known to be effective (a "known-good" patch) as a template for generating a new patch.

Operation 204 may include generating a patch based on a given distance. For example, operation 204 may include generating a patch designed to be effective within 5 meters (which may be considered a "near" patch/distance in some instances). In some instances, operation 204 may include generating a patch designed to be effective at 15 meters (considered a "far" patch/distance).

Over time, generation at operation 204 may be refined. For example, certain features (such as concentrations of curves/edges, color gradients, etc.) may be learned to be particularly useful in fooling classifiers. Thus, even if initial iterations of operation 204 may be mostly random, in some instances operation 204 may include modifying a template based upon learned features to generate an effective adversarial patch. These refinements are often range-specific. For example, a first assortment of curves might be useful for deceiving detection models at near distances but useless at far distances. Therefore, modifying the patch generator to include the first assortment of curves in output patches might be useful for a near patch generator but unhelpful for a far patch generator. In view of this, the features implemented at operation 204 may be vary depending upon whether the generated patch is intended to be effective at a near distance or a far distance.

Method 200 further comprises modifying, at operation 206, the sample image acquired via operation 202 to insert the adversarial patch generated via operation 204 in the image. The modifications of operation 206 may result in an edited image which may appear as if the adversarial patch were a part of the sample image. For example, a sample image may depict a person wearing a shirt with a blank patch on it. Operation 206 may include editing the sample image to look as if the person's shirt had the adversarial patch on it rather than the blank patch. For example, operation 206 may include identifying a size and shape of the blank patch and modifying the adversarial patch to match. As an example, an adversarial patch may be a square having sides 600 pixels in length. Operation 206 may include detecting a blank patch on a person's shirt, identifying that the blank patch is in the shape of a parallelogram having sides that are 50 pixels in length. Operation 206 may further include converting the adversarial patch from a square shape into the parallelogram shape, and scaling the size by 50/600. The resulting modified adversarial patch may then be overlaid over the blank patch in the image, resulting in the adversarial patch appearing as though the image were captured of a person wearing a shirt bearing the adversarial patch. In some instances, operation 206 may account for lighting, a disconnect between digital colors of the generated patch and printed colors that might be produced by the manufacture of the shirt depicted in the image, etc. when modifying the image.

Method 200 further comprises evaluating object detection model performance at operation 208. Operation 208 may include, for example, submitting the modified image as input to an object detection model and receiving an output. For example, an object detection model such as YOLOv3 may receive images as input, analyze the image in an attempt to detect (and, in some instances, identify) objects depicted in the image, and output results of the analysis including identification of objects detected in the image. In some instances, the output may include a classification and a confidence value describing how confident the model is in its classification. For example, the model may output "98% dog" indicating that the model is 98% confident that the image depicts a dog. Operation 208 may include evaluating an accuracy of the output of the system based on annotations of the modified image. As an example, operation 208 may include determining whether an object detection model is able to correctly identify that a person wearing the patch in the modified image was a person.

For example, a sample image may depict a person wearing a shirt. The sample image may be known to depict the person (either via metadata tags or via a user manually identifying the person). The sample image may be modified to include the adversarial patch on the person's shirt, and the modified image may be submitted to an object detection model. The object detection model may output any identified objects (including people). If the system determines that no people are present in an image that is known to include a person, the accuracy of the output may be evaluated as 0%. If the system determines that three people are present in an image that is known to include four people, the accuracy of the output may be 75%. If the system determines that four people are present in an image that is known to include two people, the accuracy of the output may be 50%, etc.

The object detection model utilized at operation 208 may be an existing, pretrained system (e.g., YOLOv3) or can be a newly-trained system. In general, an accurate system is preferable, as an inaccurate system may erroneously result in the generator being designated as effective.

Inclusion of an adversarial patch in an image may negatively impact accuracy of an object detection model. Such an impact can be described as a performance of the patch. Patches can be associated with one or more performance criteria, describing how effective the patch is at disrupting performance of object detection models.

Method 200 further comprises determining whether performance criteria of the patch are met at operation 210. Operation 210 may include, for example, comparing the performance identified at operation 208 to one or more thresholds, such as an accuracy threshold. For example, an accuracy threshold of 15% or lower may be a performance criterion; if the system is unable to defeat the patch at least 85% of the time, the patch's performance criteria may be met.

If the patch's performance criteria are not met (210 "No"), method 200 further comprises updating, at operation 212, the patch generator based on the performance. Operation 212 may include adjusting one or more weights and/or connections in a machine learning model utilized in the patch generator. The adjustments made at operation 212 may be based on impact of previous adjustments; for example, if a first weight is increased and the patch's performance decreases, then operation 212 may include decreasing the first weight. In some instances, adjustments made at operation 212 may be random. In some instances, changes that are evaluated to result in more significant impacts on performance may be focused on. For example, a patch generator may be an artificial neural network (ANN) having a number of interconnected nodes, with each connection having a given weight. Changes to the generator may comprise changes to the weights of the connections. For example, a weight may be increased or decreased, and a resulting impact on generated patch performance can be evaluated.

Once updates are made, method 200 loops back to operation 204, generating a new patch from the updated patch generator. Operations 206-210 may then be repeated. As stated above, impacts of the adjustments made at operation 212 may be evaluated at subsequent iterations. For example, once a weight is increased or decreased, the resulting impact can be evaluated by generating a new patch via the revised generator, inserting the new patch into a sample image, submitting the new modified image to an object detection model, and comparing an accuracy of the object detection model to that previously evaluated at operation 208. If increasing a first weight results in a performance improvement, further increases to the first weight may be tested.

Once the patch's performance criteria are met (210 "Yes"), method 200 proceeds to end at operation 214. In some instances, performance criteria may require several successful iterations before the generator is considered fully trained. As an example, a single patch in a single modified image may successfully deceive an object detection model. However, in order to ensure that this is not a coincidence/fluke, the same patch may be tested using other sample images.

In some instances, trained patch generators may include some degree of randomization when generating patches; in other words, the same generator may be able to generate multiple different adversarial patches designed to perform the same task (e.g., hinder performance of an object detection model). Training a patch generator to generate unique adversarial patches that are all consistently able to deceive object detection models may yield a more expansive training set, useful for training an object detection model to defeat adversarial patches. Thus, in some instances, in order to ensure that a single successful iteration is not a fluke, the patch generator may generate additional patches, to be used in additional images, to verify that the patch generator is consistently able to generate patches that can deceive detection systems.

As different object detection models may perform differently, in some instances, method 200 may be performed using several different models to attempt to train a patch generator to generate adversarial patches capable of deceiving all available models. However, this may substantially increase training time and resource requirements, and there is no guarantee that a single patch generator may be able to generate patches that consistently deceive all object detection models. Thus, in some instances, method 200 may be repeated with different models, resulting in multiple patch generators. For example, method 200 may be performed with a first object detection model, resulting in a first adversarial patch generator capable of consistently generating adversarial patches that can fool the first object detection model. Method 200 may then be repeated for a second object detection model, resulting in a second adversarial patch generator (different from the first generator) capable of consistently generating adversarial patches that can fool the second object detection model.

As noted, the generator trained via method 200 may be a near patch generator or a far patch generator. Whether the generator is a near patch generator or a far patch generator can be controlled at operations 202 and 206 (i.e., the operations involving the image). For example, in order to train a near patch generator, operation 202 may include selecting a sample image depicting a person close to a camera capturing the image. Then, after inserting the adversarial patch into the image at operation 206, the resulting modified image may simulate the adversarial patch relatively near to the camera. In contrast, in order to train a far patch generator, operation 202 may include selecting a sample image depicting a person far from a camera capturing the image. Then, after inserting the adversarial patch into the image at operation 206, the resulting modified image may simulate the adversarial patch relatively near to the camera. In some instances, the sample image can be further modified to adjust the apparent distance of the patch/object. This is described in further detail below with reference to FIG. 4.

Therefore, in some instances, multiple different generators can be trained for each object detection model. For example, method 200 can be performed a first time to train a first near generator using a first object detection model. Method 200 can be performed a second time to train a first far generator (distinct from the first near generator) using the same first object detection model, and so on.

Figure 3:
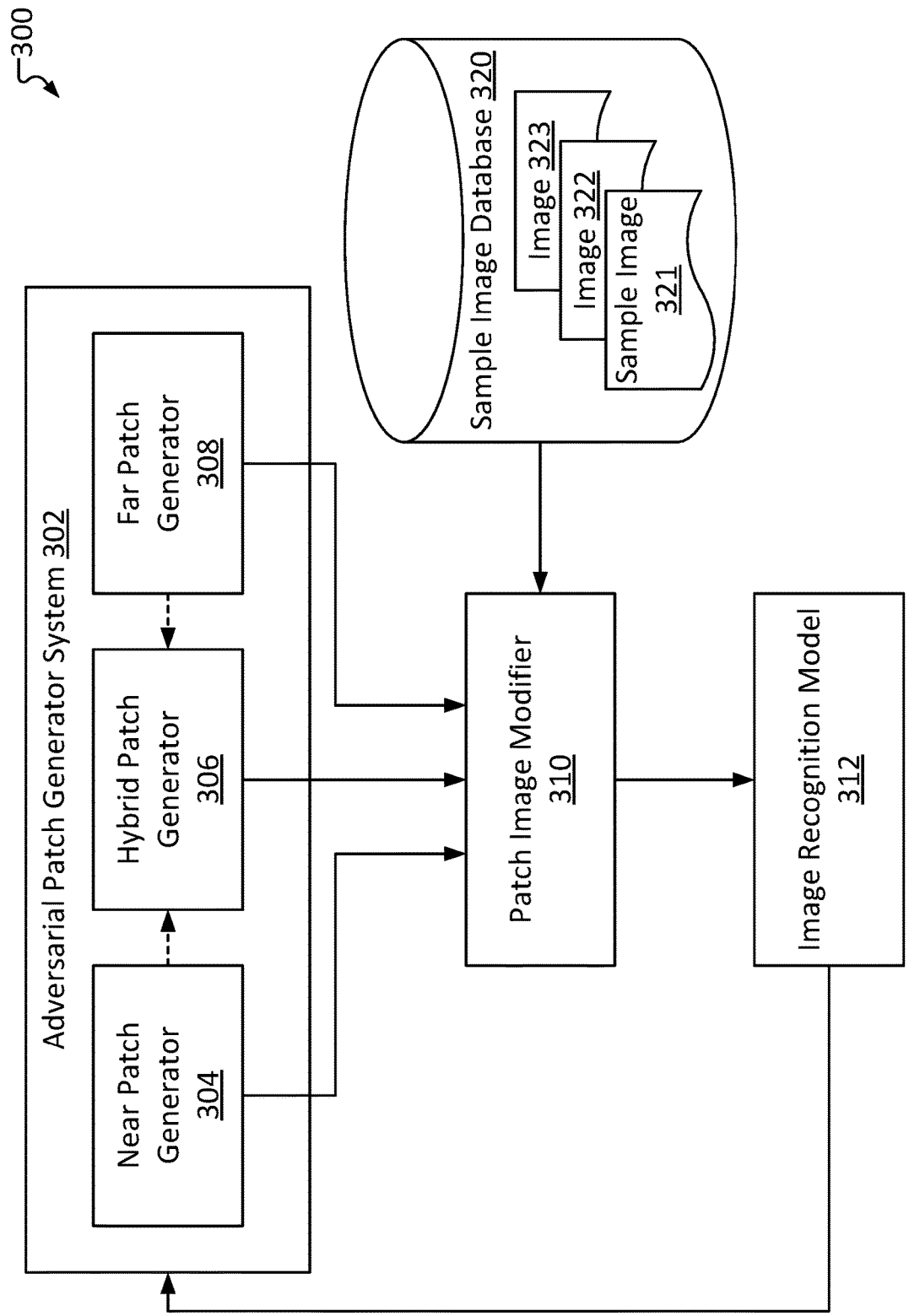
FIG. 3 is a diagram of a system including adversarial patch generators and an object detection model, consistent with several embodiments of the present disclosure.
Figure 4A:
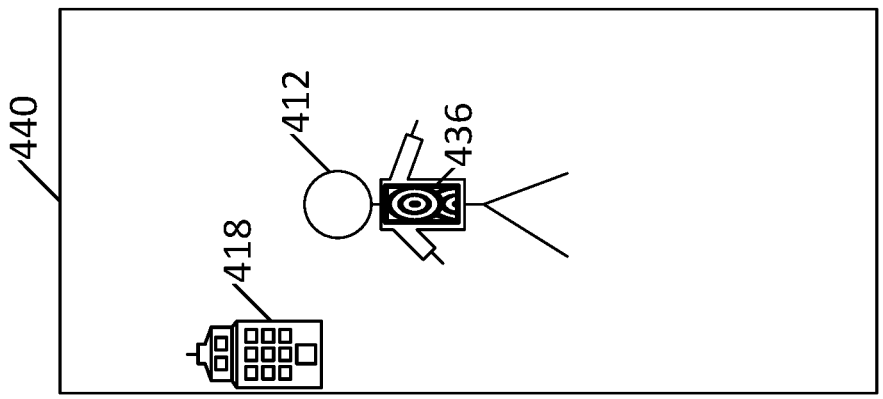
FIG. 4A is a diagram of a sample image including a blank patch target, consistent with several embodiments of the present disclosure.
Figure 4B:
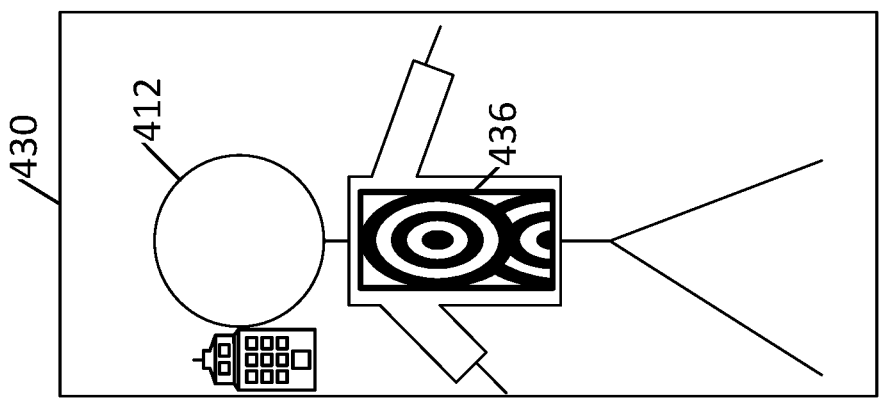
FIG. 4B is a modified image including an abstract representation of a near adversarial patch at a near distance, consistent with several embodiments of the present disclosure.
Figure 4C:
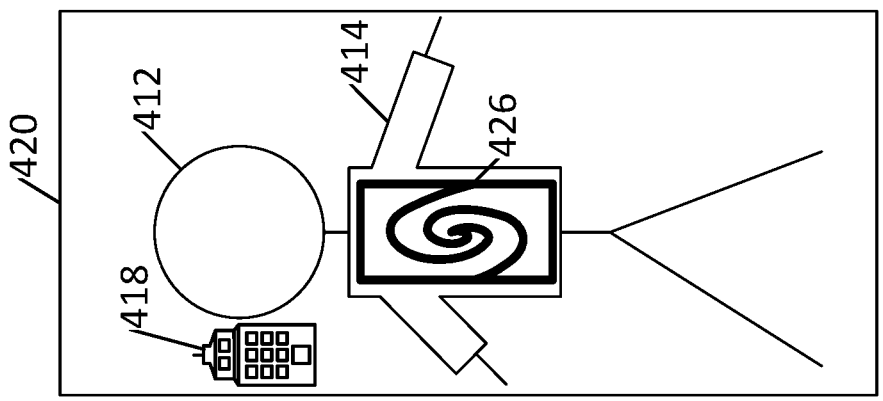
FIG. 4C is a modified image including an abstract representation of a hybrid adversarial patch at a near distance, consistent with several embodiments of the present disclosure.
Figure 4D:
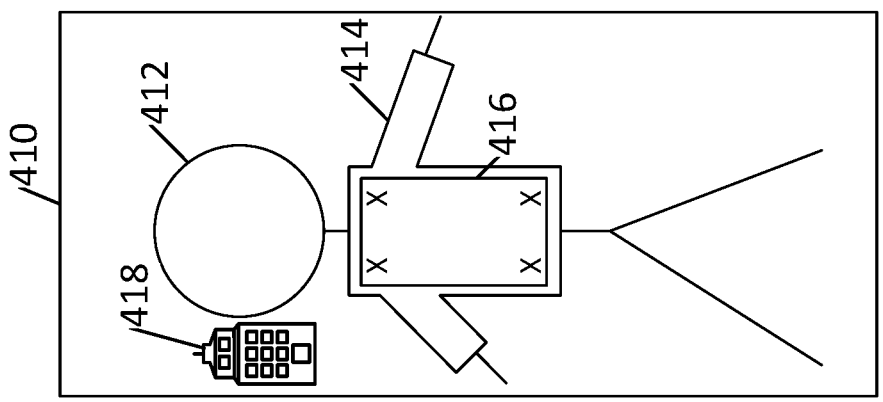
FIG. 4D is a modified image including an abstract representation of a hybrid adversarial patch at a far distance, consistent with several embodiments of the present disclosure.

FIG. 3 is a diagram of a system 300 including adversarial patch generators and an object detection model, consistent with several embodiments of the present disclosure.

System 300 includes a set of adversarial patch generators 302. Patch generators 302 include near patch generator 304, far patch generator 308, and hybrid patch generator 306. Patch generators 302 may be stored in memory (not shown in FIG. 3). Each of patch generators 302 may initially be untrained (e.g., outputting random pixels). However, patch generators 302 can be trained over time to output adversarial patches that can be effective against various object detection models at various distances.

Near patch generator 304 may be trained to generate adversarial patches that fool detection systems at close distances (e.g., <10 m, <5 m, etc.). Far patch generator 308 may be similar to 304, but trained to generate patches that fool systems at far distances (e.g., >=10 m, >=5 m, etc.).

Hybrid patch generator 306 may be trained to learn from both near patch generator 304 and far patch generator 308 to generate patches that have good performance at both close and far distances ("hybrid patches"). In some instances, hybrid patch generator 306 may simply merge patches generated by generators 304 and 308. For example, each pixel of a hybrid patch may be generated based on an average of red-green-blue (RGB) values of both a near patch's corresponding pixel and a far patch's corresponding pixel. In other instances, hybrid patch generator 306 may utilize more complex algorithms such as, for example, striping, weighted merging, etc., as described in further detail below with reference to method 500 of FIG. 5.

System 300 further includes patch image modifier 310. Image modifier 310 is configured to generate training images. Each training image may depict an object and a patch generated from one of generators 302. The training images may be generated based in part on sample images received from sample image database 320.

Sample image database 320 is a database including multiple images such as image 321, image 322, and image 323. Database 320 may be stored locally or online (e.g., cloud-based). As an example, sample image 321 may be an image depicting a user wearing a shirt having a blank target designating a spot for an adversarial patch. Sample image 322 may be a different image of the same user wearing the same shirt (for example, the different image may have been captured at a different location, from a different distance, under different lighting conditions, etc.). Sample image 323 may, for example, be an image of a different user wearing a different shirt, etc.

Patch image modifier 310 may acquire a patch from near patch generator 304 as well as sample image 321. Patch image modifier may then edit sample image 321 to include a depiction of the patch received from generator 304, resulting in a modified image depicting the user wearing the shirt with the adversarial patch on the shirt. Examples of sample and modified images are provided in FIG. 4, as discussed in further detail below.

Patch image modifier 310 advantageously enables usage of multiple training images without needing to, for example, print a patch onto a shirt and capture a new image for every patch generated from one of generators 302. As an illustrative example, without patch image modifier 310 to generate test images by inserting patches into sample images, method 200's operation 206 might require creating a test image, which would require a physical example of the adversarial patch generated at operation 204. As an example, a user might acquire a shirt, print out an adversarial patch to be evaluated, affix the patch to the shirt, and capture a picture of a person wearing the shirt. A second test image might require printing out an additional patch and affixing it to the shirt (instead of or on top of the previous patch), and capturing a new picture, etc. In contrast, patch image modifier can circumvent this process by acquiring a sample image and digitally modifying the sample image into a test image. In this way, patch image modifier 310 can result in significant time and effort savings.

System 300 further comprises object detection model 312. Object detection model 312 may be trained to detect and/or classify objects, people, etc., though various adversarial patches may be able to deceive it. Object detection model 312 may be one of several existing object detection models such as, for example, YOLOv3. In some instances, object detection model 312 may be a newly-created model that is being trained to defeat patches generated by generators 302. Access to many existing object detection models may be limited as they may be closed-source and/or proprietary.

As modified images including patches generated by generators 302 may be input to object detection model 312, system 312 may produce outputs including classifications of the images. These outputs can be compared to known values and used to update generators 302.

FIG. 4 is a diagram 400 of a sample image 410 as well as several modified images including adversarial patches, consistent with several embodiments of the present disclosure.

Sample image 410 may be an example of image 321 of database 320, as discussed above with reference to FIG. 3. Sample image 410 includes person 412 and a building 418. Person 412 is wearing a shirt 414. Shirt 414 includes a scan target 416, which may be interpreted by a patch image generator as designating a region in which to insert an adversarial patch.

As mentioned, sample image 410 is provided for exemplary purposes only; sample images do not need to depict a person wearing a shirt, nor do they require a designated patch region (the patch region can be identified automatically).

Building 418 is included in the background of sample image 410 merely for purposes of illustration and to provide a reference point and scale.

Diagram 400 also depicts a first modified image 420. First modified image 420 ("image 420") depicts the same person 412 wearing the same shirt 414 (with the same building 418 in the background). However, scan target 416 has been replaced with adversarial patch 426. First modified image 420 may be generated by, for example, patch image modifier 310 of system 300, described above with reference to FIG. 3. Adversarial patch 426 may be, for example, a near adversarial patch generated by near patch generator 304.

In some instances, sample image 410 may be input to a patch generator, and patch 426 may be generated based upon an estimated (or annotated) distance of user 412 from the camera capturing image 410.

Diagram 400 also depicts a second modified image 430. Second modified image 430 ("image 430") is similar to image 420 (and thus 410), but with a different patch 436. Patch 436 may be, for example, a far distance patch generated by a far patch generator such as generator 308 of system 300. Thus, an object detection model such as model 312 may be provided with multiple test images including different adversarial patches (e.g., 426, 436) even with only a single sample image 410.

Diagram 400 also depicts a third modified image 440. Third modified image 440 ("image 440") is generally similar to images 410-430, except user 412 is depicted at a greater distance from the camera, as evidence by a size of user 412 relative to building 418. This results in patch 436 appearing smaller in image 440 than it does in image 430. In turn, this results in less detail of patch 436 being available to an object detection model attempting to evaluate image 440.

In some instances, a far image can be generated based on a near image. For example, in some instances, image 440 can be generated based upon image 430 (e.g., user 412/shirt 414/patch 436 can be digitally "shrunk"). This shrinking may be performed after inclusion of patch 436, to simulate loss of information in patch 436 resulting from the increased distance from the camera. In some instances, the shrinking operation may include pixelating or compressing the patch to reduce a level of detail of the patch.

In contrast, in some instances, a near image may be generated based on a far image. For example, in some instances, image 430 may be generated based on 440. This may involve, for example, cropping far image 440 to just a region of the image containing user 412 and patch 436, upscaling the cropped region, and then replacing the upscaled patch 436 with a new copy of patch 436 (so patch 436 is at a level of detail expected for near image 430). This may enable comparison of patch performance at different apparent distances with minimal change to other aspects of the image. For example, the background, user pose, lighting, etc. may be identical between images 430 and 440, allowing for a more reliable comparison of performance of the patch at various distances. In some instances, image 440 can be generated based upon a second sample image (not shown in FIG. 4).

Figure 5:
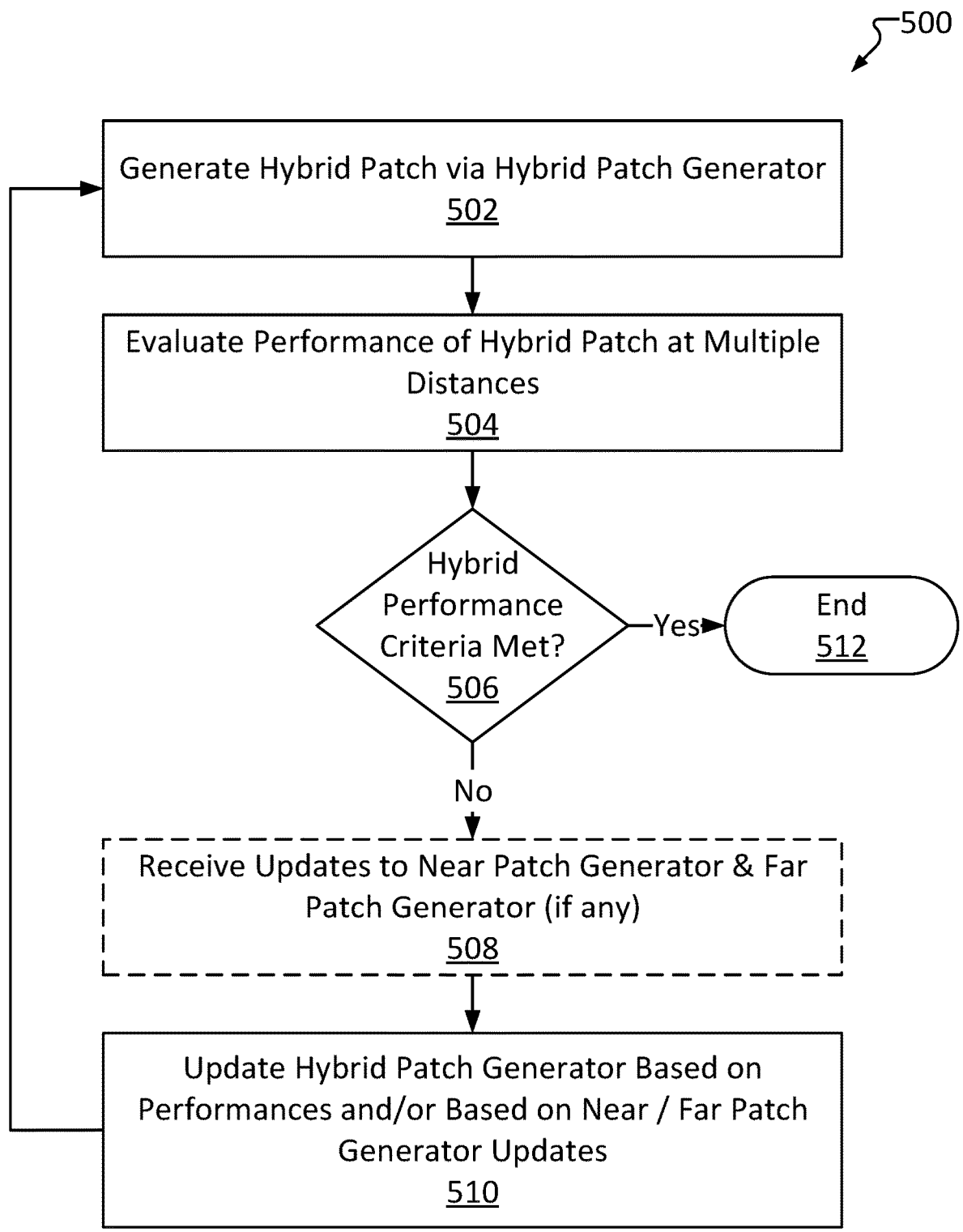
FIG. 5 is a detailed method of training a hybrid-distance adversarial patch generator, consistent with several embodiments of the present disclosure.

FIG. 5 is a detailed method 500 of training a hybrid-distance adversarial patch generator, consistent with several embodiments of the present disclosure. In some instances, method 500 may be performed to train a hybrid patch generator while method 200 is being performed to train near and/or far patch generators.

Figure 6:
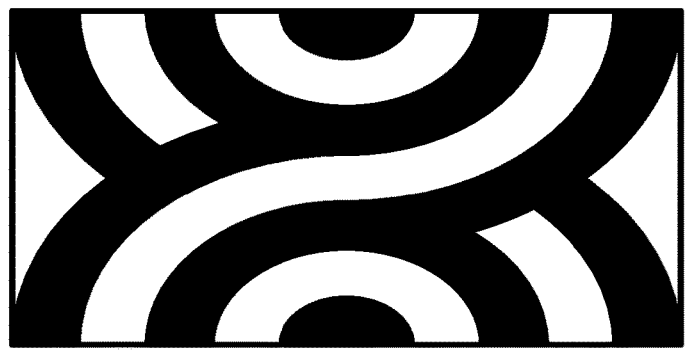
FIG. 6 depicts an example of merging a near-distance patch and a far-distance patch into a hybrid-distance patch, consistent with several embodiments of the present disclosure.
Figure 6:
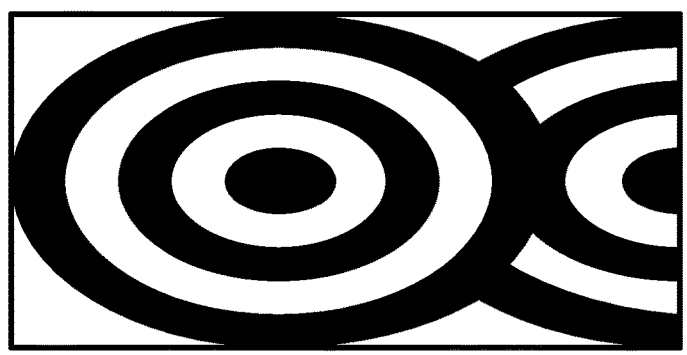
Figure 6:

Method 500 comprises generating a hybrid patch via a hybrid patch generator at operation 502. In some instances, operation 502 may be similar to operation 204 (e.g., a dedicated hybrid patch generator generates the patch). In some instances, operation 502 may include receiving a near patch and a far patch and performing a merge operation on the two, resulting in a combined hybrid patch. An example merge operation is depicted in FIG. 6, as discussed below.

Method 500 further comprises evaluating, at operation 504, performance of the hybrid patch at multiple distances. In order to evaluate performance of the hybrid patch, a system performing method 500 may submit an image depicting the hybrid patch to an object detection system. In order to acquire such an image, operation 504 may include modifying a sample image to insert the hybrid patch at a particular apparent distance. As the hybrid patch is to be evaluated at multiple distances, operation 504 may include modifying images to insert the hybrid patch at different distances. For example, operation 504 may include receiving a sample image such as image 410 and generating multiple modified images such as image 430 and image 440. Notably, the images include the same patch but at different distances.

In some instances, the near and far images utilized at operation 504 may be based on the same sample image. This may advantageously reduce a number of variables in evaluations performed at operation 504, enabling a more reliable evaluation of the patch's performance at different distances. As an example, a first sample image depicting a person at a near distance may have been captured during daytime in a desert, while a second sample image depicting a second person at a near distance may have been captured at dusk in a rainforest. Even though both sample images depict a person at a near distance, an object detection system analyzing the two sample images may have different levels of effectiveness (e.g., accuracy). This can be due to the differences between the sample images (such as lighting, background, the person to be identified, etc.). As performance of the hybrid patch is evaluated based upon effectiveness of the object detection system, inserting the hybrid patch into both of these sample images may result in a range of values describing the patch's near-distance performance. While this may be useful for determining how consistently the patch may perform at a near distance, use of different sample images for different distances may skew evaluations of performance of the patch at multiple distances. In other words, using the same sample image for multiple distances increases confidence that any differences in patch performance between the two distances are actually a result of the different distance.

Operation 504 may further include submitting the images to an object detection model and receiving an output. Operation 504 includes receiving multiple object detection evaluations; at least one near evaluation and at least one far evaluation. A single object detection model may be utilized for the near and far object detection. This may further reduce variability in results, as different models perform differently. For example, the hybrid adversarial patch being evaluated may be effective against a first object detection model but ineffective against a second object detection model (though a system performing method 500 may not yet be "aware" of this). Further, a first test image may depict the hybrid patch and an object at a far distance, while a second test image may depict the object and the hybrid patch at a near distance. In such an example, submitting the first test image to the first model and submitting the second test image to the second model may result in the first model failing to identify the object and the second model succeeding in identifying the object. This may appear to suggest that the hybrid patch is effective at far distances but ineffective at near distances. However, because the hybrid patch is generally ineffective against the second model, the second model's ability to identify the object may not have anything to do with the distance. Utilizing the same model for multiple distance evaluations can help alleviate this uncertainty. Further, training a patch generator to defeat multiple models at once can significantly impact training time and is not guaranteed to be possible.

Method 500 further comprises determining whether hybrid patch performance criteria have been met at operation 506. Operation 506 may be generally similar to operation 210 of method 200, except hybrid patches may have additional performance criteria. For example, in some instances, a minimum performance for each distance may be enforced. As an example, a minimum performance of 80% success in deceiving an object detection model may be required. Thus, a hybrid patch generated that is 95% successful at deceiving an object detection model when the patch is in a "near" image and 76% successful at deceiving the same object detection model when the patch is in a "far" image may not be considered adequate in terms of performance criteria.

As another example, hybrid patches may have a maximum overall performance criterion. For example, a hybrid patch may be required to have a total success rate (e.g., near success %+far success %) of at least 170%. Thus, a hybrid patch generated that is 81% successful in "near" images and 87% successful in "far" images may satisfy the minimum criterion but may fail to satisfy the overall performance criterion, as 81%+87%=168%<170%.

If the performance criteria are not met (506 "No"), the hybrid patch generator may be updated. As method 500 may be performed contemporaneously with method 200, a system performing method 500 can leverage updates made to a near patch generator and a far patch generator in order to inform updates to the hybrid patch generator. Thus, method 500 may further comprise receiving, at operation 508, updates to a near patch generator and a far patch generator (if any updates have been made to a near and/or far generator since a last iteration of operation 508 or since method 500 has begun). For example, if method 500 is being performed contemporaneously with method 200, operation 508 may include receiving any updates that were made as part of operation 212. For example, in some instances, operation 508 may include identifying weights being changed in a previous iteration or the last several iterations for both near and far generators. In some instances (for example, if no updates have been made to near or far patch generators, or if no near or far patch generators are available/being trained at all during performance of method 500), operation 508 may be skipped.

In some instances, operation 508 may be omitted entirely. For example, even though updates to near and/or far patch generators may be helpful in making updates for training a hybrid patch generator, they are not required; method 500 can be performed to train a hybrid adversarial patch generator alone. Training the hybrid patch generator without a near or far patch generator may take additional time/iterations, but can still result in an effective generator.

Method 500 further comprises updating, at operation 510, the hybrid patch generator based on the evaluated performances and/or the near/far patch generator updates.

Performance-based updates may be similar to those of operation 212, except operation 504 includes evaluating multiple performances, so operation 510 is basing updates on multiple variables. As a result, there may be two competing pressures (i.e., stemming from the near performance and stemming from the far performance). For example, the near performance evaluated at operation 504 might suggest that a first weight should be increased by a first amount (e.g., 3) while the far performance evaluated at operation 504 might suggest that the same first weight should be decreased by a second amount (e.g., 7), resulting in a conflict. In order to determine how to resolve the conflict and update the generator, operation 510 may include, for example, summing the changes (e.g., the weight may have been increased by 3 and decreased by 7, yielding in a net update of 3−7=−4, resulting in decreasing the weight by 4).

If any updates to near and/or far patch generators were received at operation 508, operation 510 may further include consolidating updates made to two generators (i.e., updates to near/far generators) into an update for one (i.e., an update to the hybrid generator). For example, if a given weight was adjusted in a near generator but not adjusted in a far generator, the given weight may be adjusted by a reduced amount (e.g., half) in the hybrid generator. If the same weight is adjusted by the same amount in both generators, then a corresponding weight can be adjusted by the same amount in the hybrid generator.

As noted, in some instances, the hybrid patch generator can just be a simple algorithm to merge a near patch and a far patch. In such instances, operation 510 may simply include adjusting how the two patches are merged (e.g., 60% near/40% far, etc.).

Method 500 further comprises looping back to operation 502 and generating a new hybrid patch, repeating operations 502-506. In some instances, the same hybrid patch may be evaluated in multiple different ways. For example, the same patch may be tested with different test images input into several different object detection model. In either case, operation 510 may loop to 504.

Once the hybrid patch performance criteria are met (506 "Yes"), method 500 ends at 512. As with method 200, in some instances, multiple consecutive successes may be required to satisfy the performance criteria at 506. As an example, a single patch in a single pair of test images may successfully deceive an object detection model at both near and far distances. However, in order to ensure that this is not a coincidence/fluke, the same patch may be tested using other sample images.

Method 500 may result in a trained hybrid patch generator that can be effective at deceiving object detection models at both near and far distances.

FIG. 6 depicts an example of merging a near-distance patch 602 and a far-distance patch 604 into a hybrid-distance patch 606, consistent with several embodiments of the present disclosure. Patches 602, 604, and 606, as depicted in FIG. 6, are merely provided as abstract examples.

In some instances, patches 602 and 604 may be combined on a pixel-by-pixel basis; for example, each pixel of patch 606 may be an average (in terms of red/green/blue (RGB) values) of a corresponding pixel from both near patch 602 and far patch 604. In some instances, the merging can be adjusted based on performance. For example, if hybrid patch 606 is underperforming in a near image, a merging algorithm may be weighted more heavily in favor of near patch 602.

As discussed above with reference to method 500, merging two patches is not the only way to generate a hybrid patch; hybrid patches can be generated from a unique hybrid patch generator. Such a hybrid generator may be trained based on far and near patch generators (such as via operation 508 and 510), but in some instances, the hybrid generator may not require near and far patch generators at all (i.e., 508 can be skipped). Thus, near patch 602 and far patch 604 may not necessarily be generated or required as inputs for generation of hybrid patch 606.

Figure 7:
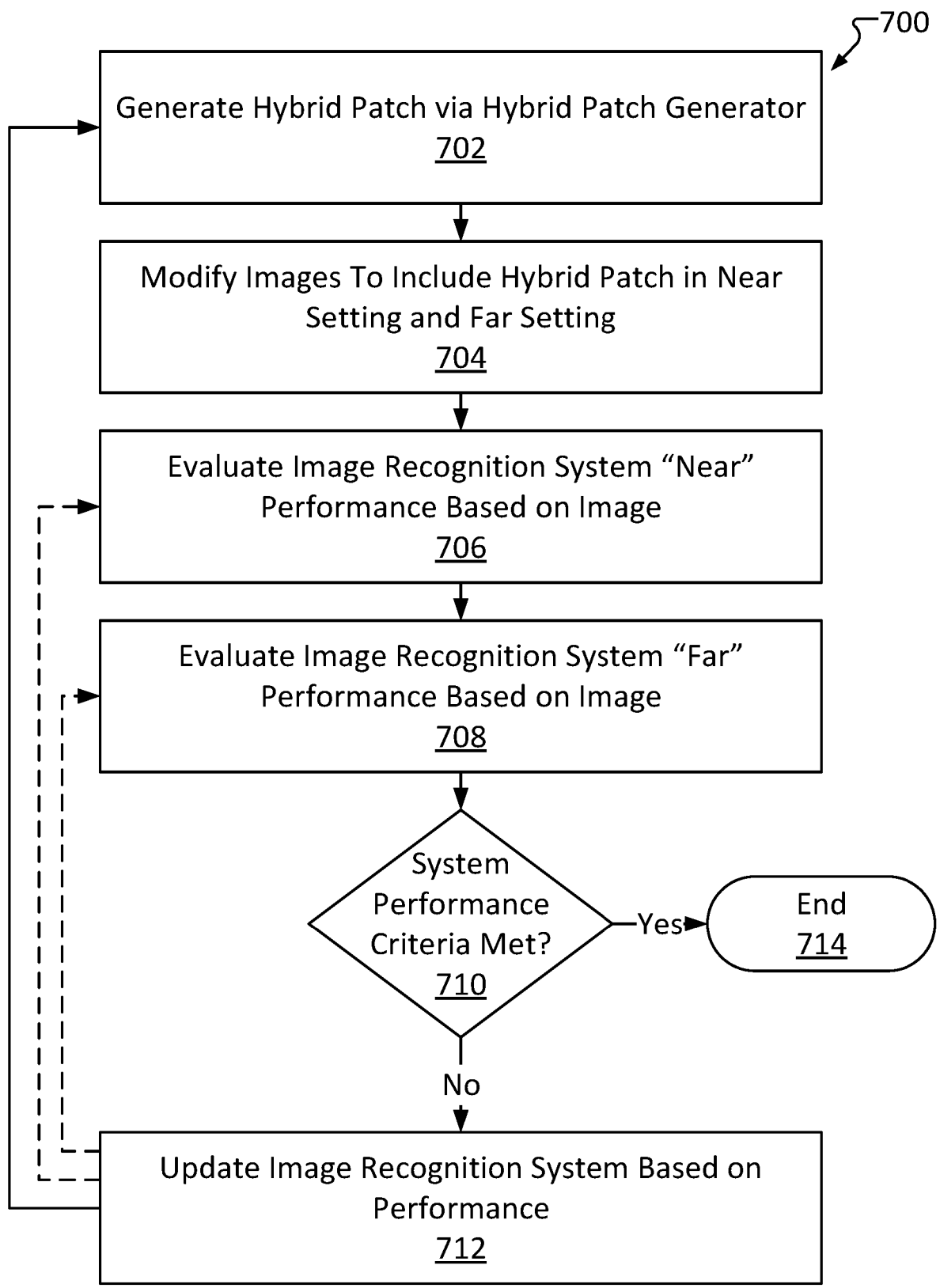
FIG. 7 is a detailed method of training an object detection model to defeat hybrid-distance adversarial patches, consistent with several embodiments of the present disclosure.

FIG. 7 is a detailed method 700 of training an object detection model to defeat hybrid-distance adversarial patches, consistent with several embodiments of the present disclosure. Method 700 comprises generating a hybrid patch via a hybrid patch generator at operation 702. Operation 702 may be performed in a substantially similar manner as operation 502 of method 500, discussed above with reference to FIG. 5. However, operation 702 may include generating a patch via a trained hybrid patch generator.

Method 700 further comprises modifying, at operation 704, images including the hybrid patch in a near setting and a far setting. Operation 704 may include, for example, utilizing a sample image and digitally inserting the hybrid patch generated at operation 702 into the sample image, resulting in a first modified image. The first modified image can then be further modified to adjust an apparent distance of the patch, resulting in a second modified image. Image 430 and image 440, discussed above with reference to FIG. 4, are provided as examples of a first and second modified image including the same patch.

Method 700 further comprises evaluating an object detection model's "near" performance based on one of the modified images at operation 706. Operation 706 may include, for example, submitting the modified image to an object detection model and causing the system to attempt to classify/detect objects in the image. Results of the system can then be compared to known values. For example, operation 706 may include determining whether an object in the image bearing an adversarial patch was correctly detected and/or identified. Further, a confidence value of the object detection model may be retrieved.

Method 700 further comprises evaluating the object detection model's "far" performance based on another of the modified images at operation 708. Operation 708 may be performed in a substantially similar manner to operation 706, except with a different modified image. For example, operation 706 may be performed utilizing an image such as image 430, while operation 708 may be performed utilizing an image such as image 440.

Method 700 further comprises determining whether object detection model performance criteria have been met at operation 710. Operation 710 may include performing multiple comparisons (similar to operation 506 of method 500), such as evaluating a maximum overall performance, enforcing a minimum performance, etc. For example, an object detection model may be evaluated to identify an object at a near distance in a first image including a hybrid adversarial patch with 85% confidence and to identify an object at a far distance in a second image including the hybrid adversarial patch with 93% confidence. An overall performance may be a simple arithmetic mean of the two (i.e., (85%+93%)/2=89%). In some instances, performance criteria of the model may include a minimum overall performance of 95%, meaning the overall performance must meet or exceed 95% in order for the criterion to be met (in which case, the example object detection model would have failed, as 89%<95%). In some instances, performance criteria of the model may include a minimum absolute performance of 90%, all particular performances must meet or exceed 90% in order for the criterion to be met (in which case, the example object detection model would also have failed, as even though 93%>90%, 85%<90%). Of course, the specific thresholds can vary and be controlled by users. These thresholds can be changed based upon use case; for example, a higher minimum overall performance of 99% may result in a more adversarial-patch-resilient object detection model, but may require additional resources to train. As with operations 506 and 210, in some instances, performance criteria can require multiple consecutive successes in order to confirm that a given success if not a coincidence or fluke.

If system performance criteria have not been met (710 "No"), method 700 further comprises updating, at operation 712, the object detection model based on the performances. Operation 712 may include, for example, adjusting one or more weights of a machine learning model, etc.

Once performance criteria have been met (710 "Yes"), method 700 ends at operation 714. Thus, method 700 can train an object detection model to reliably defeat hybrid adversarial patches at multiple distances.

Figure 8:
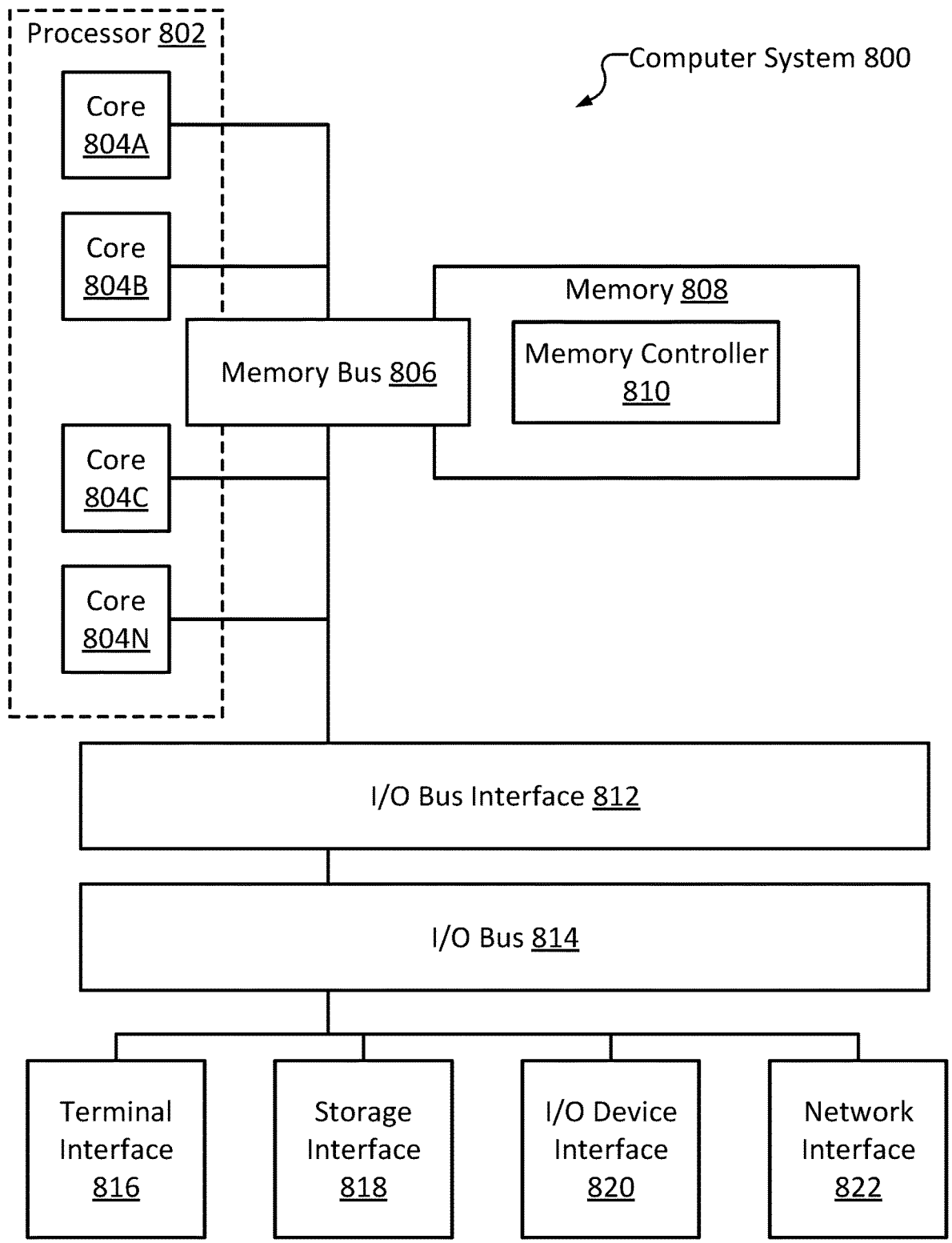
FIG. 8 illustrates a high-level block diagram of an example computer system that may be used in implementing embodiments of the present disclosure.

Referring now to FIG. 8, shown is a high-level block diagram of an example computer system 800 that may be configured to perform various aspects of the present disclosure, including, for example, methods 100, 200, 500, and 700. The example computer system 800 may be used in implementing one or more of the methods or modules, and any related functions or operations, described herein (e.g., using one or more processor circuits or computer processors of the computer), in accordance with embodiments of the present disclosure. In some embodiments, the major components of the computer system 800 may comprise one or more CPUs 802, a memory subsystem 808, a terminal interface 816, a storage interface 818, an I/O (Input/Output) device interface 820, and a network interface 822, all of which may be communicatively coupled, directly or indirectly, for inter-component communication via a memory bus 806, an I/O bus 814, and an I/O bus interface unit 812.

The computer system 800 may contain one or more general-purpose programmable processors 802 (such as central processing units (CPUs)), some or all of which may include one or more cores 804A, 804B, 804C, and 804N, herein generically referred to as the CPU 802. In some embodiments, the computer system 800 may contain multiple processors typical of a relatively large system; however, in other embodiments the computer system 800 may alternatively be a single CPU system. Each CPU 802 may execute instructions stored in the memory subsystem 808 on a CPU core 804 and may comprise one or more levels of on-board cache.

In some embodiments, the memory subsystem 808 may comprise a random-access semiconductor memory, storage device, or storage medium (either volatile or non-volatile) for storing data and programs. In some embodiments, the memory subsystem 808 may represent the entire virtual memory of the computer system 800 and may also include the virtual memory of other computer systems coupled to the computer system 800 or connected via a network. The memory subsystem 808 may be conceptually a single monolithic entity, but, in some embodiments, the memory subsystem 808 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 808 may contain elements for control and flow of memory used by the CPU 802. This may include a memory controller 810.

Although the memory bus 806 is shown in FIG. 8 as a single bus structure providing a direct communication path among the CPU 802, the memory subsystem 808, and the I/O bus interface 812, the memory bus 806 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 812 and the I/O bus 814 are shown as single respective units, the computer system 800 may, in some embodiments, contain multiple I/O bus interface units 812, multiple I/O buses 814, or both. Further, while multiple I/O interface units are shown, which separate the I/O bus 814 from various communications paths running to the various I/O devices, in other embodiments some or all of the I/O devices may be connected directly to one or more system I/O buses.

In some embodiments, the computer system 800 may be a multi-user mainframe computer system, a single-user system, or a server computer or similar device that has little or no direct user interface but receives requests from other computer systems (clients). Further, in some embodiments, the computer system 800 may be implemented as a desktop computer, portable computer, laptop or notebook computer, tablet computer, pocket computer, telephone, smart phone, mobile device, or any other appropriate type of electronic device.

It is noted that FIG. 8 is intended to depict the representative major components of an exemplary computer system 800. In some embodiments, however, individual components may have greater or lesser complexity than as represented in FIG. 8, components other than or in addition to those shown in FIG. 8 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   training a hybrid adversarial patch generator;
   generating, via the hybrid adversarial patch generator, a hybrid adversarial patch;
   inserting the hybrid adversarial patch into a first image, resulting in a first modified image depicting the hybrid adversarial patch at a first distance and a first object; and
   inserting the hybrid adversarial patch into a second image, resulting in a second modified image depicting the hybrid adversarial patch at a second distance and a second object;
   submitting the first image and the second image to a first object detection model;
   receiving an output from the first object detection model; and
   updating the hybrid adversarial patch generator based on the output.

2. The method of claim 1, further comprising:
   training a near adversarial patch generator, the training the near adversarial patch generator including updating a first weight by a first amount; and
   training a far adversarial patch generator, the training the far adversarial patch generator including updating the first weight by a second amount, wherein the training the hybrid adversarial patch generator includes updating the first weight by a third amount, the third amount based on the first amount and the second amount.

3. The method of claim 1, wherein the training the near adversarial patch generator includes training an adversarial patch modifier to modify patches generated by a pretrained patch generator.

4. The method of claim 1, further comprising training the first object detection model to detect:
   the first object in the first modified image; and
   the second object in the second modified image, wherein the training the first object detection model includes:
     submitting the first modified image to the first object detection model;
     receiving a first output from the first object detection model as a result of the submitting the first modified image;
     submitting the second modified image to the first object detection model;
     receiving a second output from the first object detection model as a result of the submitting the second modified image;
     evaluating a performance of the first object detection model based on the first output and the second output; and
     updating the first object detection model based on the performance.

5. The method of claim 1, wherein the generating the hybrid adversarial patch includes:
   receiving a near adversarial patch;
   receiving a far adversarial patch; and
   merging the near adversarial patch and the far adversarial patch into the hybrid adversarial patch.

6. The method of claim 5, wherein the merging includes:
   determining a first Red-Green-Blue (RGB) value of a first pixel of the near adversarial patch, the first pixel in a first relative location in the near adversarial patch;
   determining a second RGB value of a second pixel of the far adversarial patch, the second pixel in the first relative location in the far adversarial patch; and
   generating a third RGB value of a third pixel of the hybrid adversarial patch, the generating based on the first RGB value and the second RGB value, the third pixel in the first location in the hybrid adversarial patch.

7. The method of claim 1, wherein the first object is the second object.

8. A system, comprising:
   a memory; and
   a processor coupled to the memory, the processor configured to:
     train a hybrid adversarial patch generator;
     generate, via the hybrid adversarial patch generator, a hybrid adversarial patch;
     insert the hybrid adversarial patch into a first image, resulting in a first modified image depicting the hybrid adversarial patch at a first distance and a first object;
     insert the hybrid adversarial patch into a second image, resulting in a second modified image depicting the hybrid adversarial patch at a second distance and a second object;
     submit the first image and the second image to a first object detection model;
     receive an output from the first object detection model; and
     update the hybrid adversarial patch generator based on the output.

9. The system of claim 8, wherein the processor is further configured to:
   train a near adversarial patch generator, the training the near adversarial patch generator including updating a first weight by a first amount; and
   train a far adversarial patch generator, the training the far adversarial patch generator including updating the first weight by a second amount, wherein the training the hybrid adversarial patch generator includes updating the first weight by a third amount, the third amount based on the first amount and the second amount.

10. The system of claim 8, wherein the training the near adversarial patch generator includes training an adversarial patch modifier to modify patches generated by a pretrained patch generator.

11. The system of claim 8, wherein the processor is further configured to train the first object detection model to detect:
    the first object in the first modified image; and
    the second object in the second modified image, wherein the training the first object detection model includes:
      wherein the training the first object detection model includes:
      submitting the first modified image to the first object detection model;
      receiving a first output from the first object detection model as a result of the submitting the first modified image;
      submitting the second modified image to the first object detection model;
      receiving a second output from the first object detection model as a result of the submitting the second modified image;

evaluating a performance of the first object detection model based on the first output and the second output; and
updating the first object detection model based on the performance.

12. The system of claim 8, wherein the generating the hybrid adversarial patch includes:
receiving a near adversarial patch;
receiving a far adversarial patch; and
merging the near adversarial patch and the far adversarial patch into the hybrid adversarial patch.

13. The system of claim 12, wherein the merging includes:
determining a first Red-Green-Blue (RGB) value of a first pixel of the near adversarial patch, the first pixel in a first relative location in the near adversarial patch;
determining a second RGB value of a second pixel of the far adversarial patch, the second pixel in the first relative location in the far adversarial patch; and
generating a third RGB value of a third pixel of the hybrid adversarial patch, the generating based on the first RGB value and the second RGB value, the third pixel in the first location in the hybrid adversarial patch.

14. The system of claim 8, wherein the first object is the second object.

15. A computer program product, the computer program product comprising a computer readable storage medium having program instructions embodied therewith, the program instructions executable by a computer to cause the computer to:
train a hybrid adversarial patch generator;
generate, via the hybrid adversarial patch generator, a hybrid adversarial patch;
insert the hybrid adversarial patch into a first image, resulting in a first modified image depicting the hybrid adversarial patch at a first distance and a first object;
insert the hybrid adversarial patch into a second image, resulting in a second modified image depicting the hybrid adversarial patch at a second distance and a second object;
submit the first image and the second image to a first object detection model;
receive an output from the first object detection model; and
update the hybrid adversarial patch generator based on the output.

16. The computer program product of claim 15, wherein the instructions further cause the computer to:
train a near adversarial patch generator, the training the near adversarial patch generator including updating a first weight by a first amount; and
train a far adversarial patch generator, the training the far adversarial patch generator including updating the first weight by a second amount, wherein the training the hybrid adversarial patch generator includes updating the first weight by a third amount, the third amount based on the first amount and the second amount.

17. The computer program product of claim 15, wherein the instructions further cause the computer to train the first object detection model to detect:
the first object in the first modified image; and
the second object in the second modified image, wherein the training the first object detection model includes:
submitting the first modified image to the first object detection model;
receiving a first output from the first object detection model as a result of the submitting the first modified image;
submitting the second modified image to the first object detection model;
receiving a second output from the first object detection model as a result of the submitting the second modified image;
evaluating a performance of the first object detection model based on the first output and the second output; and
updating the first object detection model based on the performance.

18. The computer program product of claim 15, wherein the generating the hybrid adversarial patch includes:
receiving a near adversarial patch;
receiving a far adversarial patch; and
merging the near adversarial patch and the far adversarial patch into the hybrid adversarial patch.

19. The computer program product of claim 18, wherein the merging includes:
determining a first Red-Green-Blue (RGB) value of a first pixel of the near adversarial patch, the first pixel in a first relative location in the near adversarial patch;
determining a second RGB value of a second pixel of the far adversarial patch, the second pixel in the first relative location in the far adversarial patch; and
generating a third RGB value of a third pixel of the hybrid adversarial patch, the generating based on the first RGB value and the second RGB value, the third pixel in the first location in the hybrid adversarial patch.

20. The computer program product of claim 15, wherein the first object is the second object.

* * * * *